June 24, 1930.  A. FOLTIS  1,765,974
TABLE IMPLEMENT
Filed Feb. 13, 1929
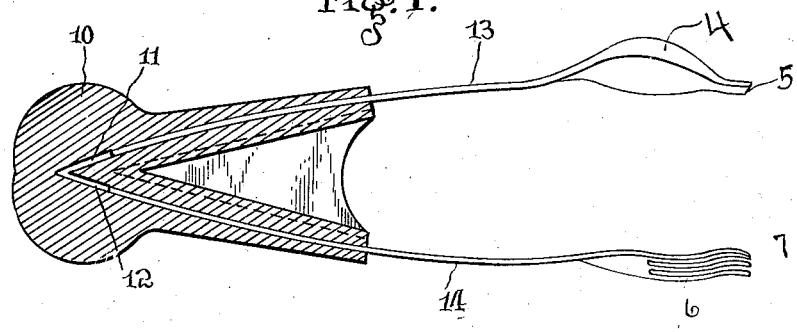
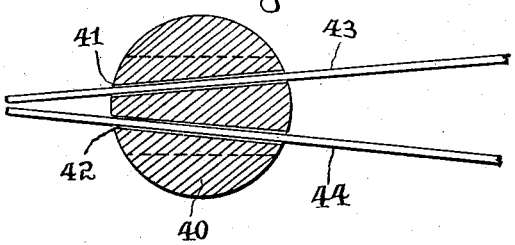
Inventor
Arnestis Foltis
By his Attorney Patented June 24, 1930

1,765,974

UNITED STATES PATENT OFFICE

ANESTIS FOLTIS, OF NEW YORK, N. Y.

TABLE IMPLEMENT

Application filed February 13, 1929. Serial No. 339,589.

My invention relates to improvements in table implements and is particularly adapted for use in serving spaghetti and like food.

The object of my invention is to provide a simple and useful table implement.

I accomplish this object by the device illustrated in the accompanying drawings, in which Figure 1 is a view of the preferred form of my device, Figure 2 is an optional form of the device.

Similar characters of reference refer to similar parts throughout the several views.

In the preferred form of the device illustrated in Figure 1, I provide a table implement comprising two gripping members 13 and 14. The gripping member 13 has a spoon-like bowl 4 with an extended scoop or nose 5, and the gripping member 2 is provided with tines 6, preferably having their outer ends 7 bent slightly away from the member 1 and preferably so arranged as to be depressed within the bowl 4 when the two gripping members 13 and 14 are brought together.

In this form of the device, I preferably employ a shaped block 10 of rubber or like elastic material, having diverging channels 11 and 12 adapted to receive and hold therein the gripping members 13 and 14. The block 10, being elastic will thus serve as a spring means for normally holding apart the gripping members 13 and 14.

In the optional form of the device illustrated in Figure 2, I have shown the spring means in the form of a rubber or elastic ball 40 having diverging channels 41, 42 respectively to receive and hold the gripping members 43, 44. The ball 40, being compressible and elastic will serve as a convenient spring means for normally spreading the gripping members.

Having thus described my invention, what I claim is:

1. In a device of the character described, a pair of arms having free ends a spoon on the free end of one said arm and a fork on the free end of the other said arm and a block of elastic medium adapted to normally space apart the free ends of said arms.

2. In a table implement an elastic compressible member in the form of a block adapted to carry spoon and fork means, and sockets in said compressible member adapted to detachably receive and hold the said spoon and fork means.

In testimony whereof, I have signed my name to this specification this fifth day of February, 1929.

ANESTIS FOLTIS.